United States Patent [19]

Farfaglia

[11] 3,860,108

[45] Jan. 14, 1975

[54] DOUBLE RATCHET CONVEYOR DRIVE MECHANISM

[75] Inventor: Silvio T. Farfaglia, Fulton, N.Y.

[73] Assignee: Phillips Petroleum Company, Bartlesville, Okla.

[22] Filed: Sept. 7, 1973

[21] Appl. No.: 395,032

[52] U.S. Cl. .................... 198/203, 64/29, 74/126, 188/82.7
[51] Int. Cl. ............................................ B65g 23/00
[58] Field of Search ...... 198/203; 74/111, 126, 128; 64/29; 192/56 R; 188/82.7

[56] References Cited
UNITED STATES PATENTS

| 2,984,336 | 5/1961 | Frost | 198/203 |
|---|---|---|---|
| 3,449,973 | 6/1969 | Ytterhag | 74/128 |
| 3,501,968 | 3/1970 | Fredell | 74/126 |
| 3,528,537 | 9/1970 | Shultz et al. | 198/34 |
| 3,786,693 | 1/1974 | Keipert | 64/29 |

Primary Examiner—Evon C. Blunk
Assistant Examiner—Jeffrey V. Nase

[57] ABSTRACT

First and second ratchets are oppositely mounted on a shaft for rotation with the shaft. A reciprocating drive element periodically moves ratchet drive pawls into driving engagement with the teeth of the first ratchet. A brake arm is pivotally mounted to move into engagement with a tooth of the second ratchet. A resiliently mounted striker arm is moved into actuating contact with the brake arm by the reciprocating drive element as the first ratchet approaches the end of its forward motion to cushion the deceleration of the first ratchet and to accurately position the shaft at the end of each forward motion. An indexing clutch can be employed with the double ratchet drive to provide indexing only in proper relationship with the shaft.

15 Claims, 8 Drawing Figures

DOUBLE RATCHET CONVEYOR DRIVE MECHANISM

The invention relates to intermittent drive mechanisms. In a specific aspect the invention relates to a ratchet drive mechanism for a conveyor.

In many systems employing intermittently actuated conveyors, the motion and positioning of the conveyor in each cycle is important. In intermittently actuated conveyors associated with machines for filling cartons with liquid material and then sealing the filled cartons, abrupt movement of the at least partially filled but unsealed containers can cause loss of product from the carton as well as improper seals resulting from the presence of liquid material on the surface to be bonded. Improper positioning of the carton can result in damage to the carton by interference between the improperly positioned carton and operating mechanisms of the machine. It is also common to employ a clutch with the drive mechanism, but clutches which permit variable slippage destroy the alignment relationship between the drive mechanism and the conveyor.

In accordance with the present invention these disadvantages are at least minimized, if not avoided, by utilizing a double ratchet drive mechanism wherein a resiliently mounted striker arm pivots a brake arm into engagement with the second ratchet as the reciprocating drive for the drive pawls of the first ratchet approaches the end of the forward motion. An indexing clutch can be utilized with the double ratchet drive mechanism to permit indexing of the conveyor only in proper relationship to the drive mechanism.

Accordingly, it is an object of the present invention to provide a new and improved intermittent drive mechanism. It is another object of the invention to provide an improved drive mechanism for intermittently actuated conveyors. Another object of the invention is to provide means for indexing a conveyor only in proper relationship to the drive mechanism. Other objects, aspects and advantages of the invention will be apparent from a study of the specification, the drawings and the appended claims to the invention.

Figure 1:
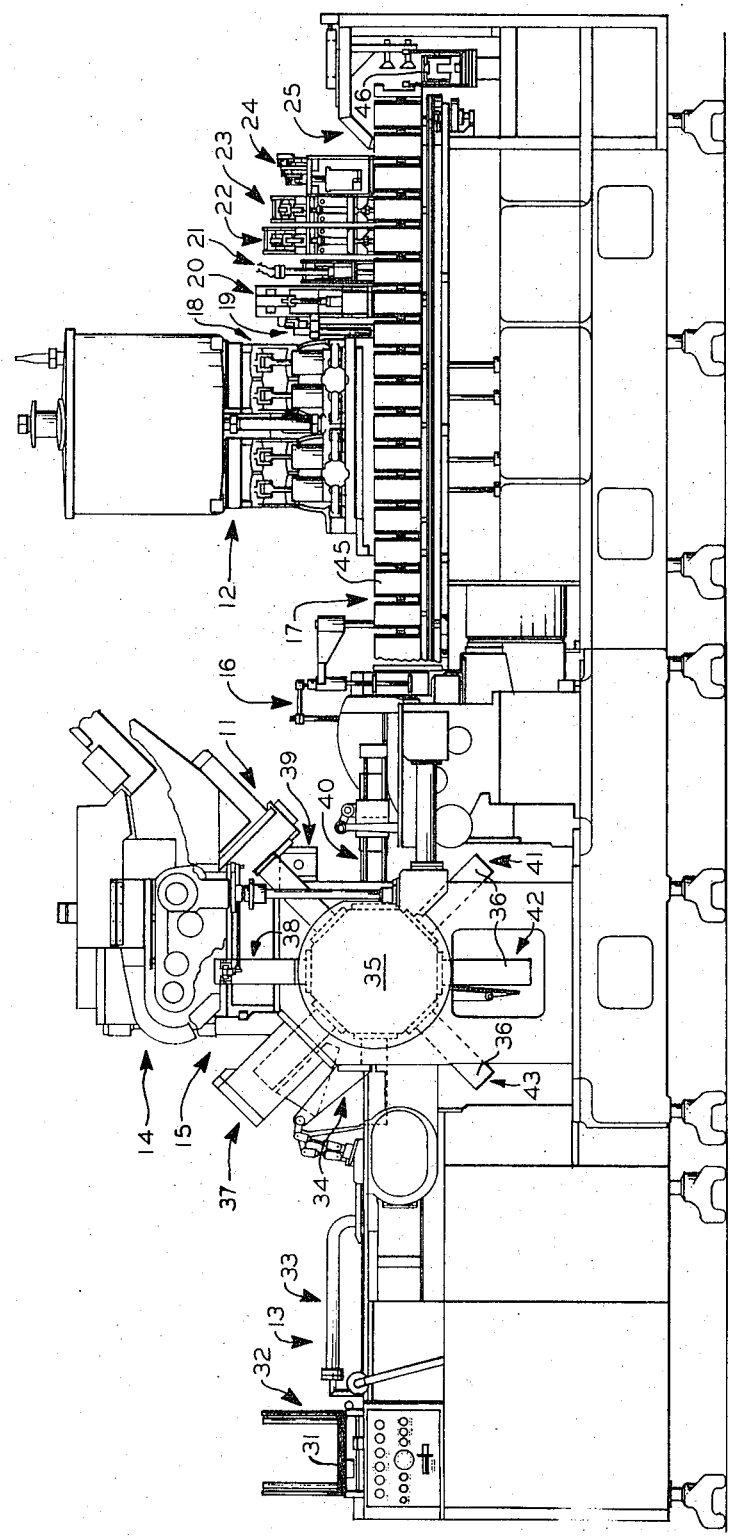
FIG. 1 is a front elevational view of a carton forming, filling and sealing machine embodying the present invention.

Referring now to the drawings in detail and to FIG. 1 in particular, the carton forming, filling and sealing machine comprises a forming section 11 and a filling and sealing section 12. The forming section 11 comprises a sidewall blank feeding and heating subsection 13, a bottom blank feeding and heating subsection 14, a forming subsection 15, and a transfer subsection 16. The filling and sealing section has two parallel endless conveyor systems 17, and each conveyor system comprises a filling subsection 18 occupying five conveyor stations, a defoaming station 19, a score breaking station 20, a top heating station 21, a folding and sealing station 22, a secondary sealing station 23, a branding station 24, and a transfer station 25.

The sidewall blanks 31 manually placed in the sidewall blank magazine 32 are flat, single sheets of paperboard, rectangular in shape, scored to provide five longitudinal panels, and a gable-top structure, and coated on both the top and bottom surfaces of each sheet with a thermoplastic material, e.g., polyethylene. The sidewall blanks 31 are successively withdrawn from magazine 32 and intermittently advanced through the sidewall blank heating station 33 to the sidewall blank receiving station 34 for turret 35. At the sidewall blank heating station 33, the side margins to be overlapped and the bottom margin of the sidewall blank are heated to a bonding temperature for the thermoplastic coating.

The turret 35 is journalled on a horizontal axis and carries eight circumferentially spaced apart mandrels 36 extending radially from the axis of turret 35. The cross section of each of mandrels 36 in a plane perpendicular to its longitudinal axis is generally rectangular. Suitable drive mechanism is provided for indexing or effecting intermittent rotation of the turret 35 to move each mandrel from the sidewall blank receiving station 34 through a blank folding station 37; a bottom end closure forming, applying and sealing station 38; a secondary bottom sealing station 39; a stripping station 40; and these successive nonoperating stations 41, 42 and 43.

Figure 2:
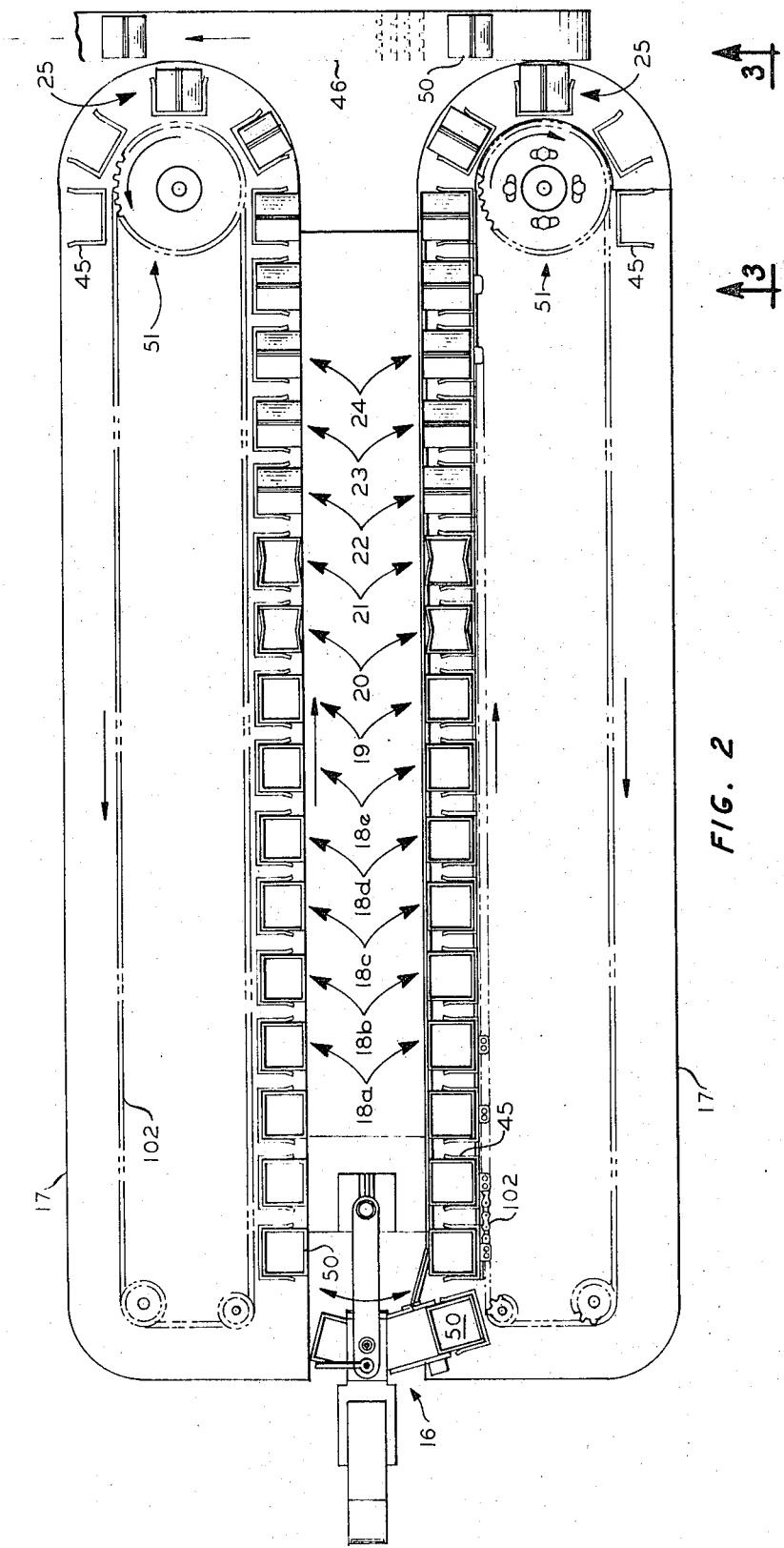
FIG. 2 is a simplified plan view showing the layout of the two endless conveyors of the filling and sealing section of the machine of FIG. 1.
Figure 3:
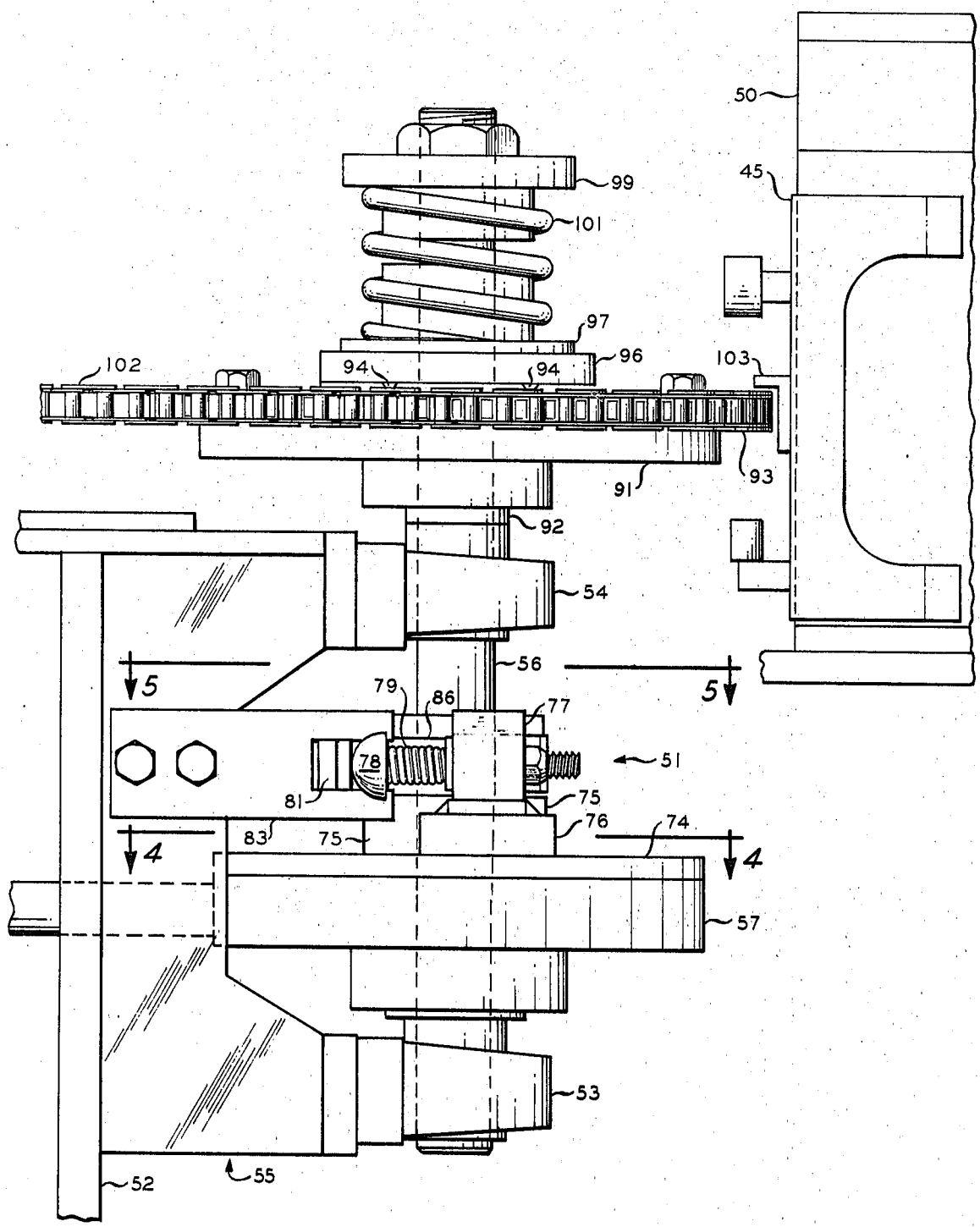
FIG. 3 is a simplified elevational view taken along the line 3—3 in FIG. 2, omitting several conveyor holders for the sake of simplicity.
Figure 4:
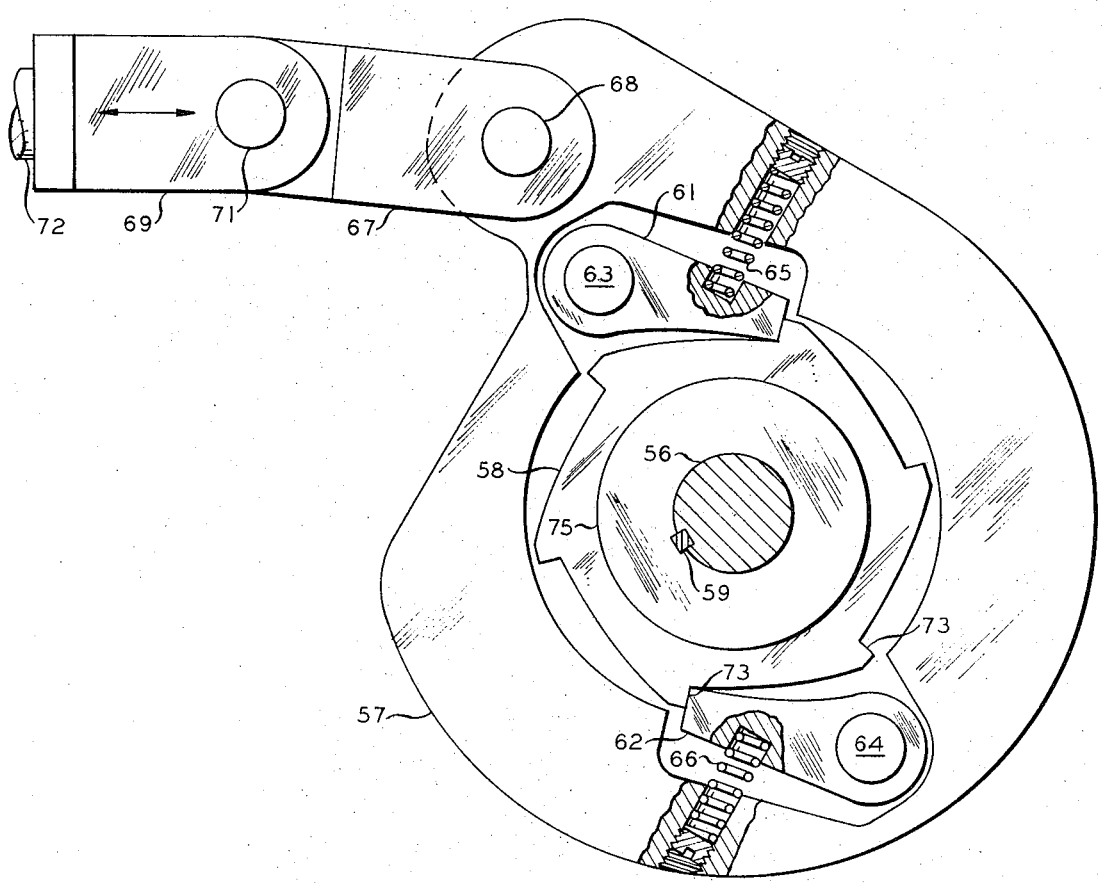
FIG. 4 is a simplified plan view taken along the line 4—4 of FIG. 3, showing the lower ratchet before the indexing of the conveyor.

Referring now to FIGS. 1 and 2, the tubular carton body having a bottom closure sealed thereto is removed from the mandrel 36 at the stripping station 40 and is transferred to a conveyor pocket 45 of one of the two conveyor systems 17. The product to be packaged is introduced into the open-topped carton 50 in four equal amounts in the filling station 18a, 18b, 18d and 18e of subsection 18. If desired, any foam resulting from the filling operation can be removed at defoaming station 19. The scores for the gable-top structure can be initially folded in the score breaking station 20, resulting in the conventional six-sided top structure. The gable-top ridge panels of the carton are heated in station 21 to a temperature at least as high as the thermal bonding temperature of the thermoplastic coatings on the carton. The heated superstructure is then folded into contact under pressure at the folding and sealing station 22 to effect the bonding of adjacent ridge panels. Secondary sealing station 23 applies pressure to the ridge panels during cooling of the thermoplastic bond. If desired, a data indicia, plant identification or other information can be applied to the bonded ridge panels of the sealed carton at branding station 24. The formed, filled and sealed carton is removed from its conveyor pocket 45 at the transfer station 25 and placed on a delivery conveyor 46.

Each conveyor system 17 is periodically driven by a ratchet drive 51 to move each conveyor pocket 45 from one station to the next adjacent station. Along the straight line portion of each conveyor run this distance is the distance from the centerline of one station to the centerline of the next station. The conveyor systems 17 maintain the conveyor pockets 45 stationary during the dwell period of each conveyor cycle to permit operations to be accomplished on the carton at each of the processing work stations 18a, 18b, 18d, 18e, 19, 20, 21, 22, 23, 24 and 25. The character of the motion of the conveyor system 17 during the conveying portion of each conveyor cycle is one of the limiting factors in the production capacity of the filling and sealing section.

Referring now to FIGS. 3 to 7, ratchet drive 51 is supported on the main frame 52 of the filling and sealing machine by means of pillow blocks 53 and 54 and bracket 55. Rotatable shaft 56 is supported in pillow blocks 53 and 54 with the elongated axis thereof extending vertically. Ratchet housing 57 is mounted around shaft 56 between pillow block 53 and pillow block 54 and is supported on pillow block 53. Lower drive ratchet 58 is attached to shaft 56 by key 59. The lower drive ratchet 58 is driven by pawls 61 and 62 which pivot about pins 63 and 64, respectively. The arms of pawls 61 and 62 are forced inwardly towards the ratchet 58 by springs 65 and 66, respectively. Housing 57 is movable about shaft 56 by linkage 67, which is rotatable about pin 68 attached to housing 57. Clevis 69 is rotatable about pin 71, which attaches clevis 69 to linkage 67. Clevis 69 is connected to and is reciprocated by drive rod 72. Drive rod 72 is reciprocated by suitable drive means, not shown. Thus, the reciprocation of drive rod 72 first rotates the ratchet housing 57 forward in a clockwise manner, as viewed in FIG. 4, about the vertical axis of shaft 56, thereby causing the forward clockwise rotation of lower drive ratchet 58 and shaft 56 from the position shown in FIG. 4 to the position shown in FIG. 6 through the engagement of the ends of pawls 61 and 62 with the teeth 73 of ratchet 58. In the reverse motion of drive rod 72, ratchet 58 and drive shaft 56 remain stationary while the ratchet housing 57 rotates about the vertical axis of shaft 56 in a counterclockwise movement to the position illustrated in FIG. 4.

Cover plate 74 is attached to the top of ratchet housing 57. Cover plate 74 has a circular hole in the central position thereof through which shaft 56 and the hub 75 of lower ratchet 57 extends. A bracket 76 is attached to the cover plate 74 to support sleeve 77 with the central axis thereof in a horizontal position. Extending through the sleeve 77 is adjustable striker bar 78 which is biased by spring 79 against the shoulder of sleeve 77. Adjustable striker bar 78 is positioned to contact brake bar 81, which is pivotable about pin 82 of supporting bracket 83, which in turn is fixably attached to the frame 52 by support bar 55. Brake bar 81 is spring biased by tension spring 84 to a normal retracted position shown in FIG. 5, wherein the brake bar 81 does not contact ratchet 86. In its extended position the tooth 85 of brake bar 81 contacts a tooth 87 of upper ratchet 86 which is fixably attached to shaft 56.

Figure 5:
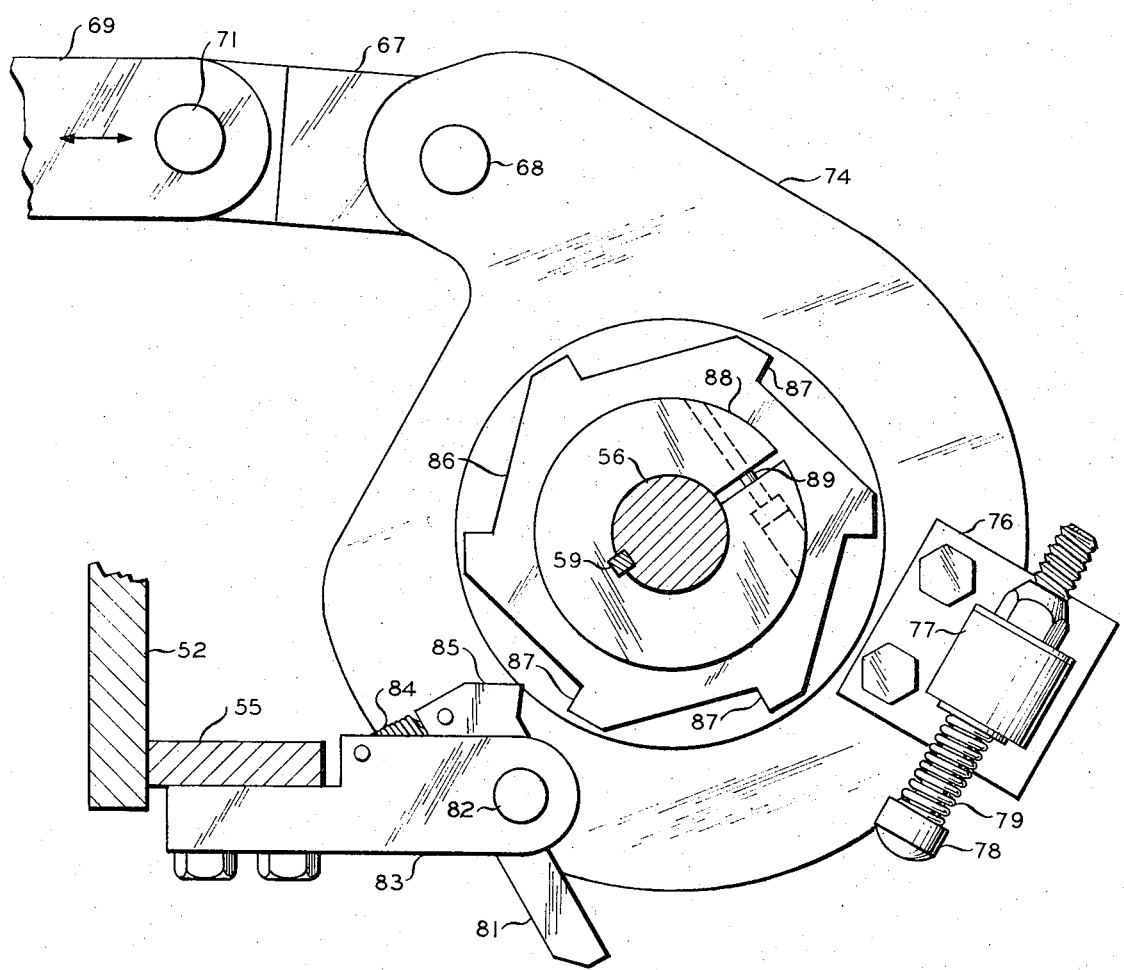
FIG. 5 is a simplified plan view taken along the line 5—5 of FIG. 3, showing the upper ratchet before the indexing of the conveyor.
Figure 6:
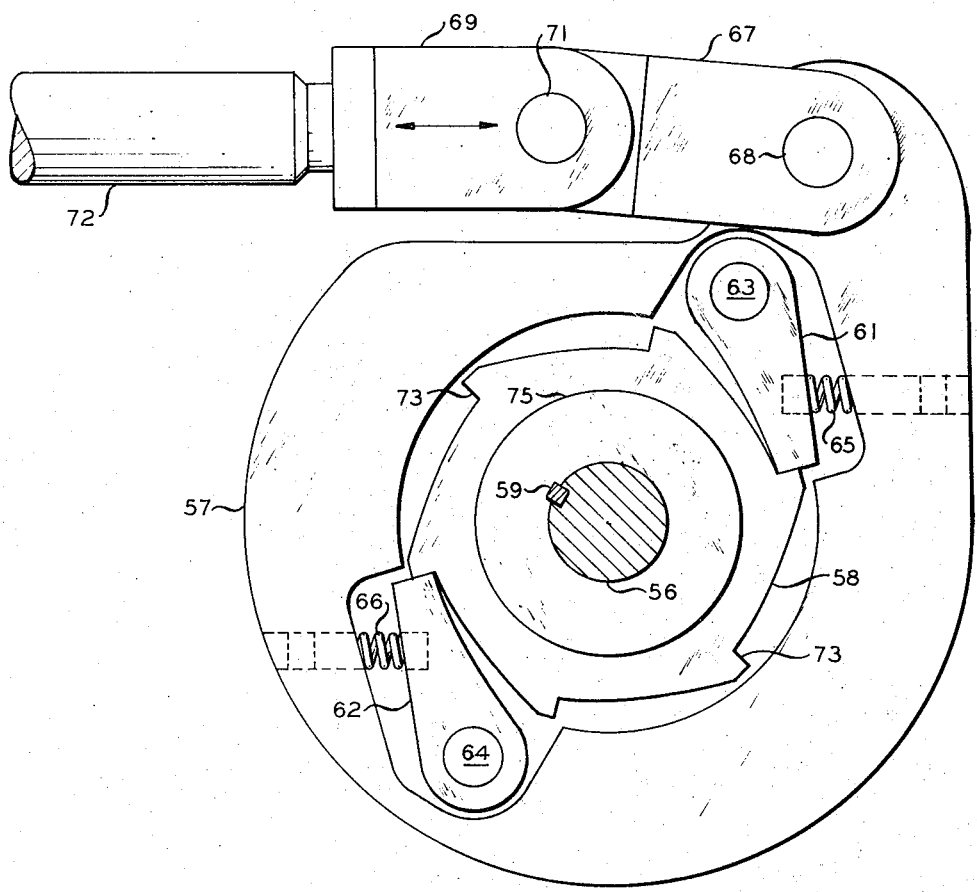
FIG. 6 is a simplified plan view taken along the line 4—4 of FIG. 3 after the lower ratchet has been indexed.
Figure 7:
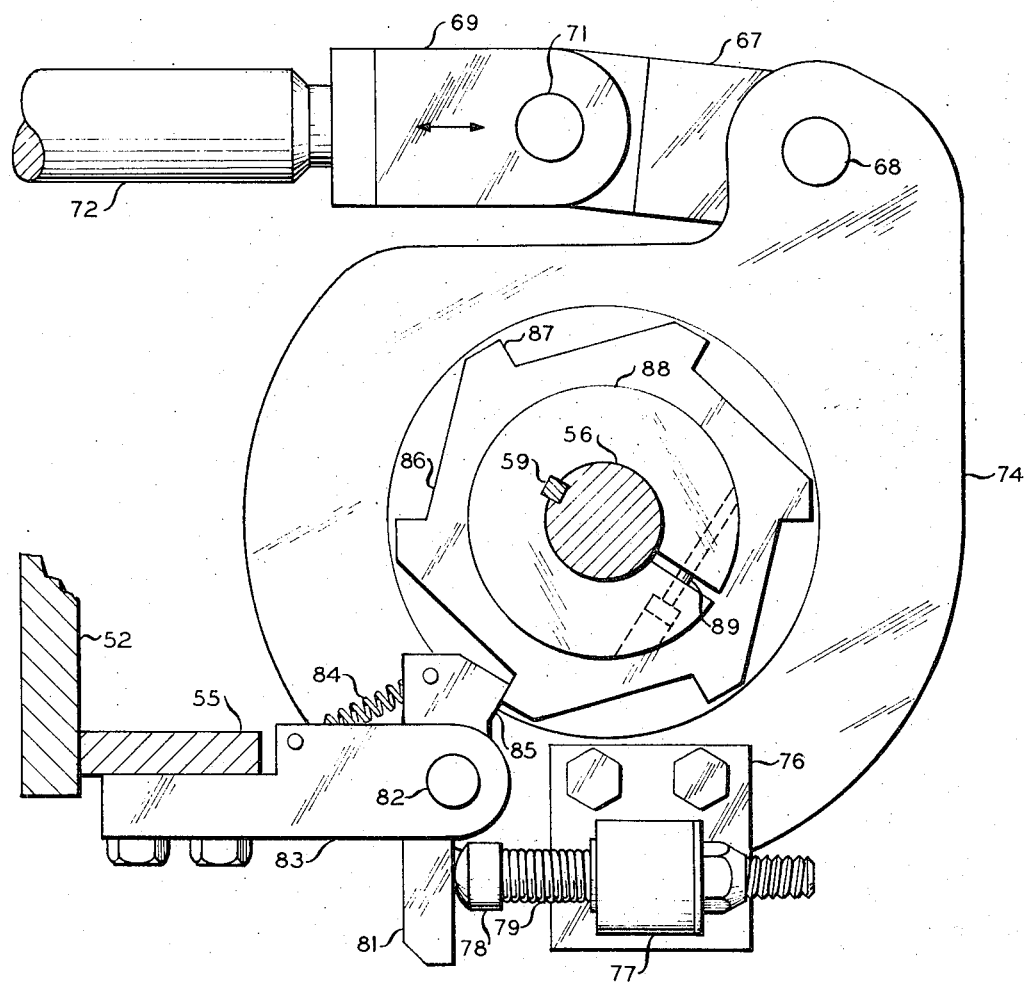
FIG. 7 is a simplified plan view taken along the line 5—5 of FIG. 3 after the upper ratchet has been indexed.
Figure 8:
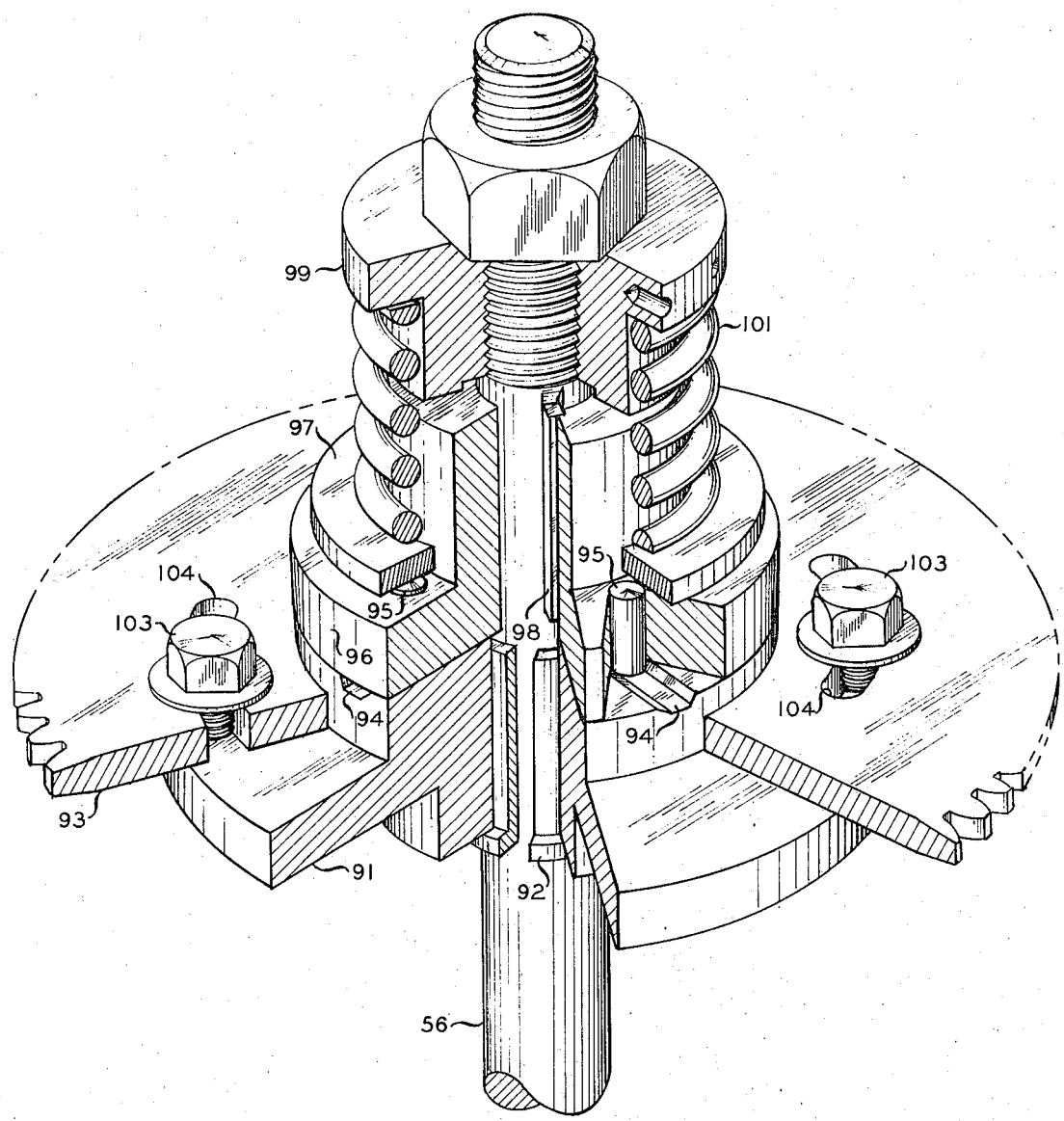
FIG. 8 is a perspective view, partly in cross section, of the clutch mechanism of FIG. 3.

The clockwise rotation of ratchet housing 57 and cover plate 74 by drive rod 72 from the position shown in FIG. 5 moves striker pin 78 into contact with the outer end of brake bar 81, causing brake bar 81 to rotate clockwise about pin 82 until the tooth 85 of brake bar 81 contacts a tooth 87 on ratchet 86. Tooth 85 of brake bar 81 contacts a tooth 87 on ratchet 86 as ratchet 86 approaches the end of the clockwise rotation. Any over travel of the conveyor sprocket drive shaft 56 which would otherwise occur due to the inertia of the conveyor chain 102, pockets 45 and cartons 50, is absorbed by spring 79. Spring 79 also serves to provide a more uniform, lower rate of deceleration for shaft 56, conveyor chain 102, pockets 45 and cartons 50. At the end of the forward travel of shaft 56 and ratchet 86, spring 79 acts through the striker bar 78 to reposition shaft 56 to its proper position before drive rod 72 starts its reverse motion to return ratchet housing 57 and the connected pawls 61 and 62 to their initial position to begin a new drive cycle. This provides an accurate positioning of ratchets 86 and 58 and shaft 56. During the counterclockwise rotation of ratchet housing 57 and cover plate 74 by drive rod 72, striker pin 78 disengages from brake bar 81, and then spring 84 causes brake bar 81 to disengage from engagement with ratchet 86. A split collar 88 is mounted about shaft 56 immediately above ratchet 86 and is keyed to shaft 56 by key 59. A set screw 89 can be used to tighten collar 88 about shaft 56 to prevent vertical movement of collar 88 on shaft 56.

Immediately above pillow block 54 is annular flange member 91 which is mounted on bushing 92 for free rotation about shaft 56. Ring shaped sprocket 93 is fixably attached to flange member 91. Flanged member 91 has in its upper surface six radial grooves 94 located sixty degrees apart to accommodate pins 95. Pins 95 extend through lower hub member 96 and are held in place by cover plate 97. Lower hub member 96 is secured to shaft 56 by key 98, while upper hub member 99 is fixably attached to shaft 56 by threaded engagement. Spring 101 is biased between cover plate 97 and hub member 99 to resiliently hold pins 95 in grooves 94 for driving sprocket 93 and associated flange member 91. Sprocket 93 drives chain 102 which has attached around its periphery brackets 103 fixably attached to carry conveyor pockets 45.

In operation, a 60 degree movement of the lower drive ratchet 58 is required to move the endless chain 102 carrying conveyor pockets 45 one position. Before indexing, the lower ratchet 58 is in the position shown in FIG. 4 and the upper ratchet 86 is in the position shown in FIG. 5. The chain 102 is accurately indexed when the reciprocating drive rod 72 moves forward, rotating the ratchet housing 57 sixty degrees, causing pawls 61 and 62 to bear against the teeth 73 of lower ratchet 58, and rotating shaft 56, upper ratchet 86, upper hub 99 and lower hub 96 sixty degrees. The rotation of lower hub 96 causes pins 95 to engage the grooves 94 of flange member 91 to drive fixably attached sprocket 93 sixty degrees and more associated chain 102 with conveyor pockets 45 one position along the path of endless conveyor 17. Accurate positioning of the conveyor is obtained when the rotation of housing 57 causes resiliently mounted striker bar 78 to strike brake pin 81, causing it to rotate about pin 82 and bear against a tooth of upper ratchet 86, stopping the shaft 56 and its associated components at the desired position. The accurate position of the conveyor 17 can be assured by adjusting the length of adjustable striker bar 78 extending through the sleeve of bracket 76. Bolts 103 extend through slots 104 in sprocket 93 to secure sprocket 93 to flange 91 and to permit adjustment of the position of sprocket 93 with respect to shaft 56. In the event the conveyor becomes jammed, a safety clutch is provided by adjusting the pressure spring 101 placed against cover plate 97 so that pins 95 can slip out of the depressions 94 of flange member 91, thereby not driving sprocket 93 when reciprocating arm 72 moves forward to rotate the housing 57. This feature also provides that the conveyor 17 will still be indexed properly once the jamming is cleared, as indexing of conveyor 17 can occur only when pins 95 are re-aligned with grooves 94, and this occurs automatically the first time the ratchet drive is indexed after the jamming is cleared. After the reciprocating arm 72 moves forwardly to index the conveyor as described above, it returns to its original position and the associated components return to their positions shown in FIGS. 4 and 5.

Reasonable variations and modifications are possible within the scope of the foregoing disclosure, the drawings and the appended claims to the invention.

That which is claimed is:

1. A ratchet drive mechanism comprising a drive shaft, a first ratchet mounted on said shaft and secured thereto for rotation therewith and having teeth extending in a first direction, a second ratchet mounted on said shaft and secured thereto for rotation therewith and having teeth extending in the direction opposite to said first direction, at least one ratchet drive pawl, support means for mounting said at least one ratchet drive pawl and adapted for rotation about the elongated axis of said shaft, means for resiliently urging said at least one ratchet drive pawl into engagement with the teeth of said ratchet during the forward rotation of said support means about the said elongated axis to rotate said first and second ratchets and said shaft during the forward rotation of said support means, reciprocating means for driving said support means forward and then backward in oscillatory rotative motion about said elongated axis, a pivotably mounted brake arm adapted to be rotated into contact with a tooth of said second ratchet during the forward rotation of said support means, a striker arm resiliently mounted on said support means and adapted to engage said brake arm and pivot said brake arm into contact with a tooth of said second ratchet during the final portion of the forward rotation of said support means.

2. Apparatus in accordance with claim 1 wherein said resiliently mounted striker arm is adapted to apply pressure to a tooth of said second ratchet to cause the driven tooth of said first ratchet to move back into contact with said ratchet drive pawl before the commencement of the backward motion of said support means in the event that said first and second ratchets and said drive shaft continued to rotate after the end of the forward motion of said support means.

3. Apparatus in accordance with claim 1 wherein two ratchet drive pawls are mounted on said support means on opposite sides of said shaft.

4. Apparatus in accordance with claim 3 wherein said support means comprises an annular housing for said lower ratchet.

5. Apparatus in accordance with claim 1 wherein said striker arm is movably mounted in a bracket on said support means, with a compression spring positioned about said striker arm between the striker head and said bracket so that said spring is compressed when said brake arm engages a tooth of said second ratchet, to thereby cushion the deceleration of said shaft at the end of the forward rotation of said support means.

6. Apparatus in accordance with claim 1 wherein said striker arm is movably mounted in a bracket on said support means, with a compression spring positioned about said striker arm between the striker head and said bracket so that said spring is compressed when said brake arm engages a tooth of said second ratchet, to thereby cushion the deceleration of said shaft at the end of the forward rotation of said support means, said spring being adapted to apply pressure to a tooth of said second ratchet to cause the driven tooth of said first ratchet to move back into contact with said ratchet drive pawl before the commencement of the backward motion of said support means in the event that said first and second ratchets and said drive shaft continued to rotate after the end of the forward motion of said support means.

7. Apparatus in accordance with claim 6 wherein two ratchet drive pawls are mounted on said support means on opposite sides of said shaft.

8. A ratchet drive mechanism comprising a drive shaft, a first ratchet mounted on said shaft and secured thereto for rotation therewith and having teeth extending in a first direction, a second ratchet mounted on said shaft and secured thereto for rotation therewith and having teeth extending in the direction opposite to said first direction, at least one ratchet drive pawl, support means for mounting said at least one ratchet drive pawl and adapted for rotation about the elongated axis of said shaft, means for resiliently urging said at least one ratchet drive pawl into engagement with the teeth of said first ratchet during the forward rotation of said support means about the said elongated axis to rotate said first and second ratchets and said shaft during the forward rotation of said support means, reciprocating means for driving said support means forward and then backward in oscillatory rotative motion about said elongated axis, a pivotably mounted brake arm adapted to be rotated into contact with a tooth of said second ratchet during the forward rotation of said support means, a striker arm resiliently mounted on said support means and adapted to engage said brake arm and pivot said brake arm into contact with a tooth of said second ratchet during the final portion of the forward rotation of said support means, an endless conveyor, an annular drive plate for driving said conveyor, said drive plate being positioned about said shaft for rotative movement free of the movement of said shaft, a clutch plate mounted on said shaft and secured thereto for rotation therewith, one of said drive plate and said clutch plate being provided with depressions in the surface thereof facing the other of said drive plate and said clutch plate, said other of said drive plate and said clutch plate being provided with pins for engaging said depressions, and means for resiliently mounting said pins so that a jamming of said conveyor will cause said pins to disengage from said depressions, thereby permitting said shaft to be indexed without rotating said drive plate.

9. Apparatus in accordance with claim 8 wherein said resiliently mounted striker arm is adapted to apply pressure to a tooth of said second ratchet to cause the driven tooth of said first ratchet to move back into contact with said ratchet drive pawl before the commencement of the backward motion of said support means in the event that said first and second ratchets and said drive shaft continued to rotate after the end of the forward motion of said support means.

10. Apparatus in accordance with claim 8 wherein two ratchet drive pawls are mounted on said support means on opposite sides of said shaft.

11. Apparatus in accordance with claim 10 wherein said support means comprises an annular housing for said lower ratchet.

12. Apparatus in accordance with claim 8 wherein said striker arm is movably mounted in a bracket on said support means, with a compression spring positioned about said striker arm between the striker head and said bracket so that said spring is compressed when said brake arm engages a tooth of said second ratchet, to thereby cushion the deceleration of said shaft at the end of the forward rotation of said support means.

13. Apparatus in accordance with claim 8 wherein said depressions are uniformly spaced at intervals corresponding to the degree of rotation of said shaft for each forward movement of said support means so that said pins will reengage said depressions only when said drive plate is in proper relationship with said drive shaft.

14. Apparatus in accordance with claim 8 wherein said striker arm is movably mounted in a bracket on said support means, with a compression spring positioned about said striker arm between the striker head and said bracket so that said spring is compressed when said brake arm engages a tooth of said second ratchet, to thereby cushion the deceleration of said shaft at the end of the forward rotation of said support means, said spring being adapted to apply pressure to a tooth of said second ratchet to cause the driven tooth of said first ratchet to move back into contact with said ratchet drive pawl before the commencement of the backward motion of said support means in the event that said first and second ratchets and said drive shaft continued to rotate after the end of the forward motion of said support means.

15. Apparatus in accordance with claim 14 wherein two ratchet drive pawls are mounted on said support means on opposite sides of said shaft.

* * * * *